United States Defensive Publication [19] (H) [11] T987,004

Feuer et al. [43] Oct. 2, 1979

[54] SYSTEM FOR DETERMINING THE EXTENT OF OVERLAP BETWEEN TWO POLYGONS

[75] Inventors: Michael Feuer; Ning Nan, both of Poughkeepsie, N.Y.

[73] Assignee: International Business Machines Corporation, Armonk, N.Y.

[21] Appl. No.: 4,121

[22] Filed: Jan. 17, 1979

Related U.S. Application Data

[63] Continuation of Ser. No. 434,306, Jan. 17, 1974, abandoned, which is a continuation of Ser. No. 266,187, Jun. 26, 1972, abandoned.

[51] Int. Cl.[2] ..... G06F 15/46

[52] U.S. Cl. ..... 364/300

[57] ABSTRACT

Figure 2:
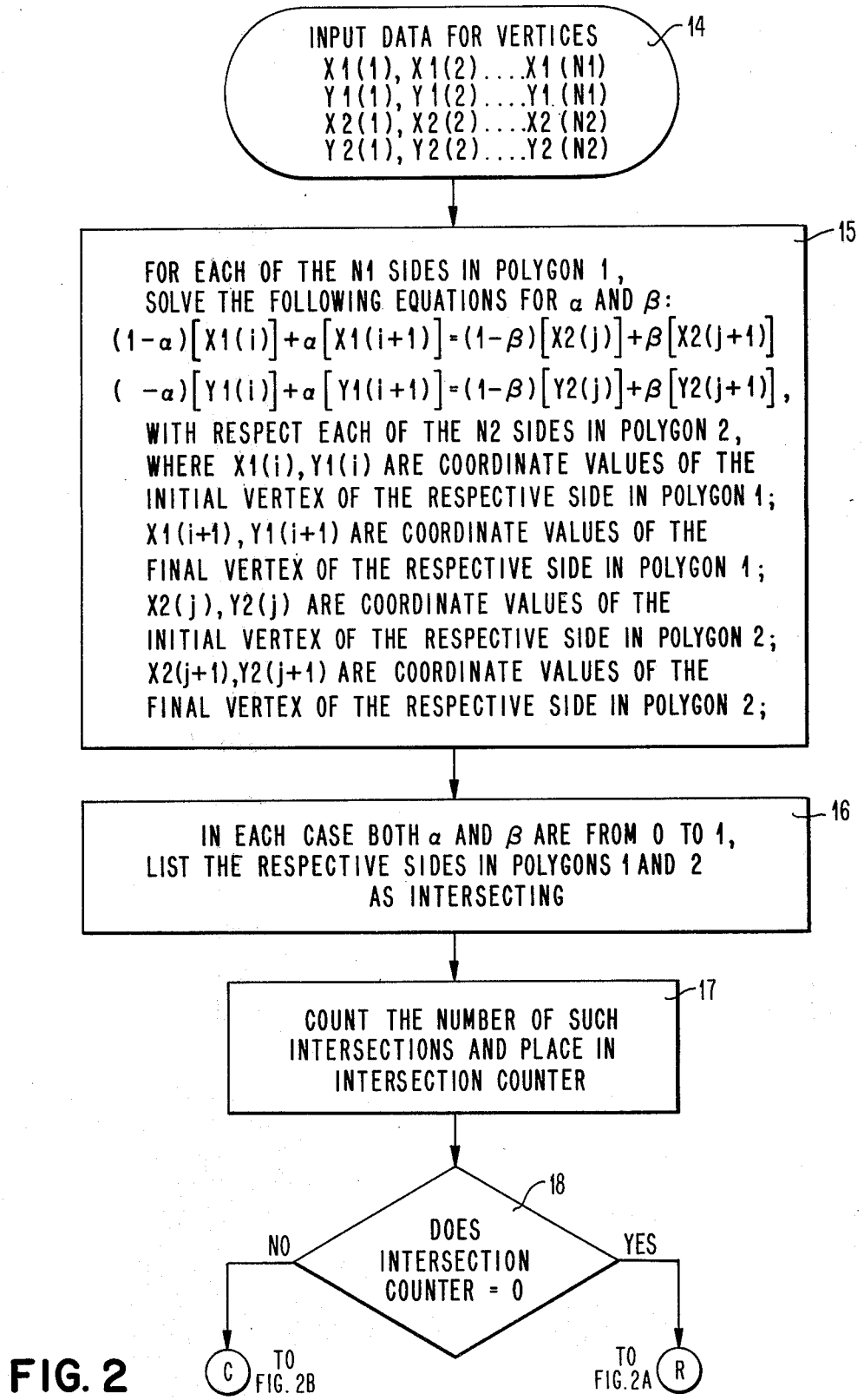
Figure 2A:
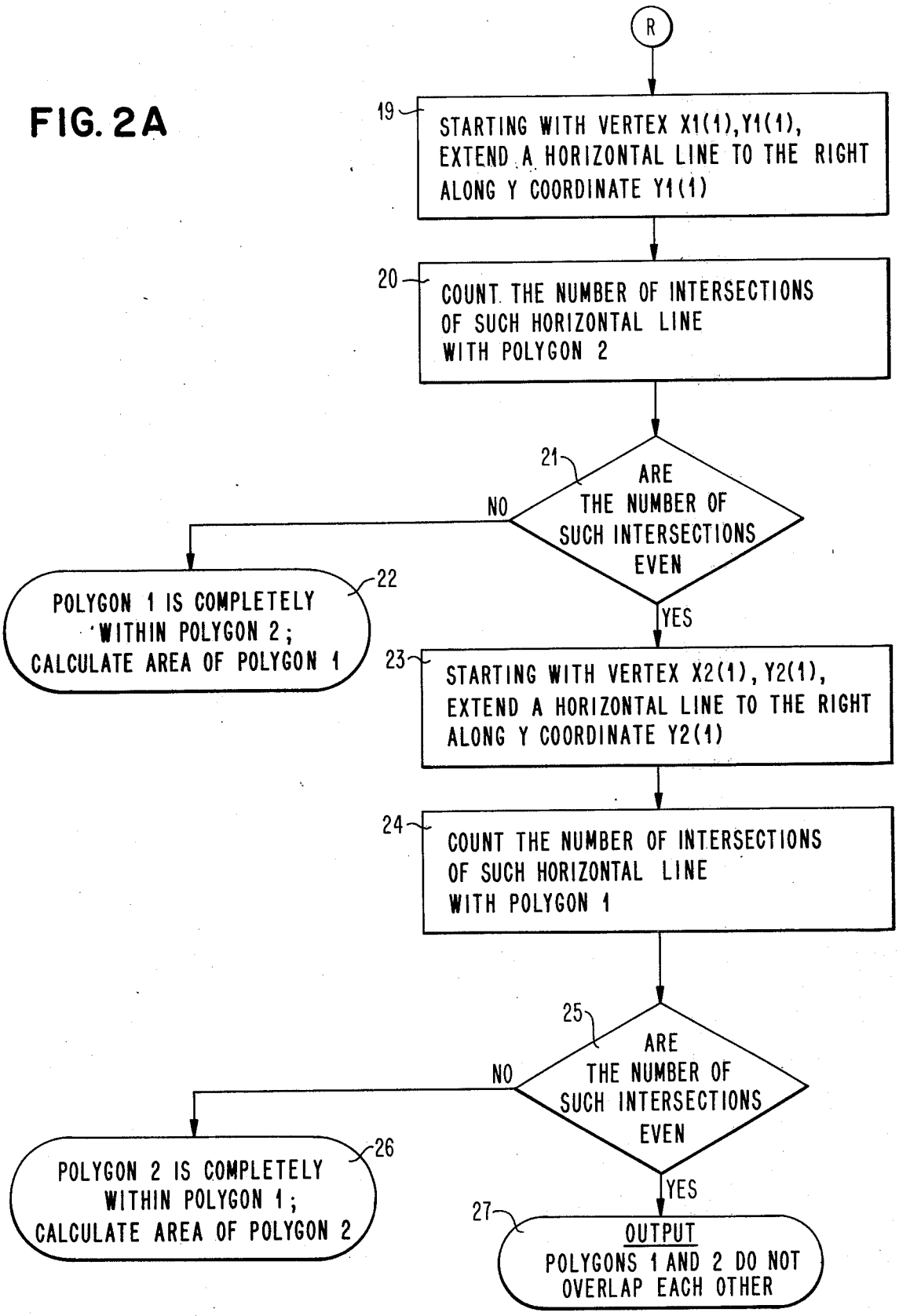
Figure 2B:
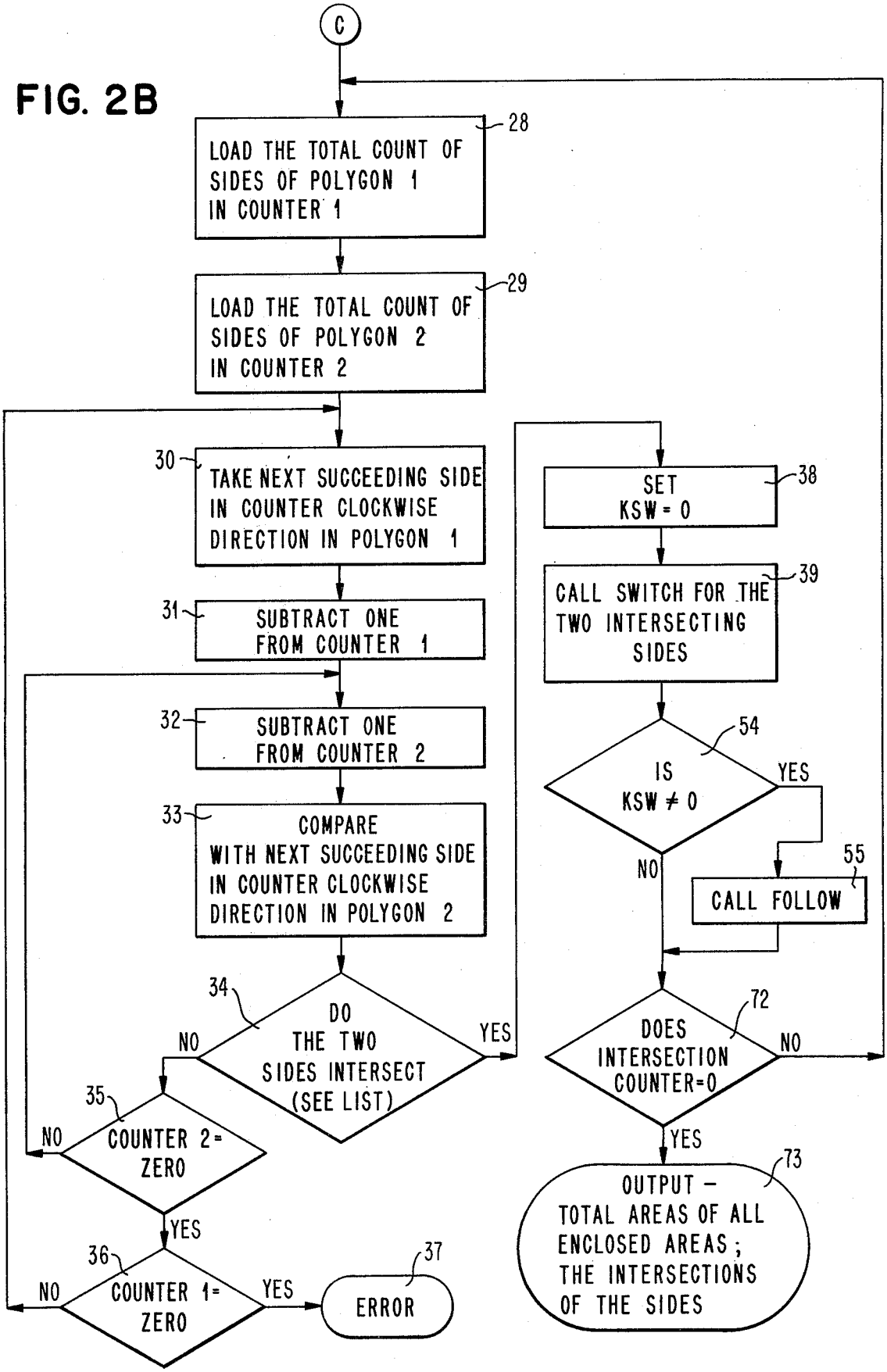
Figure 3:
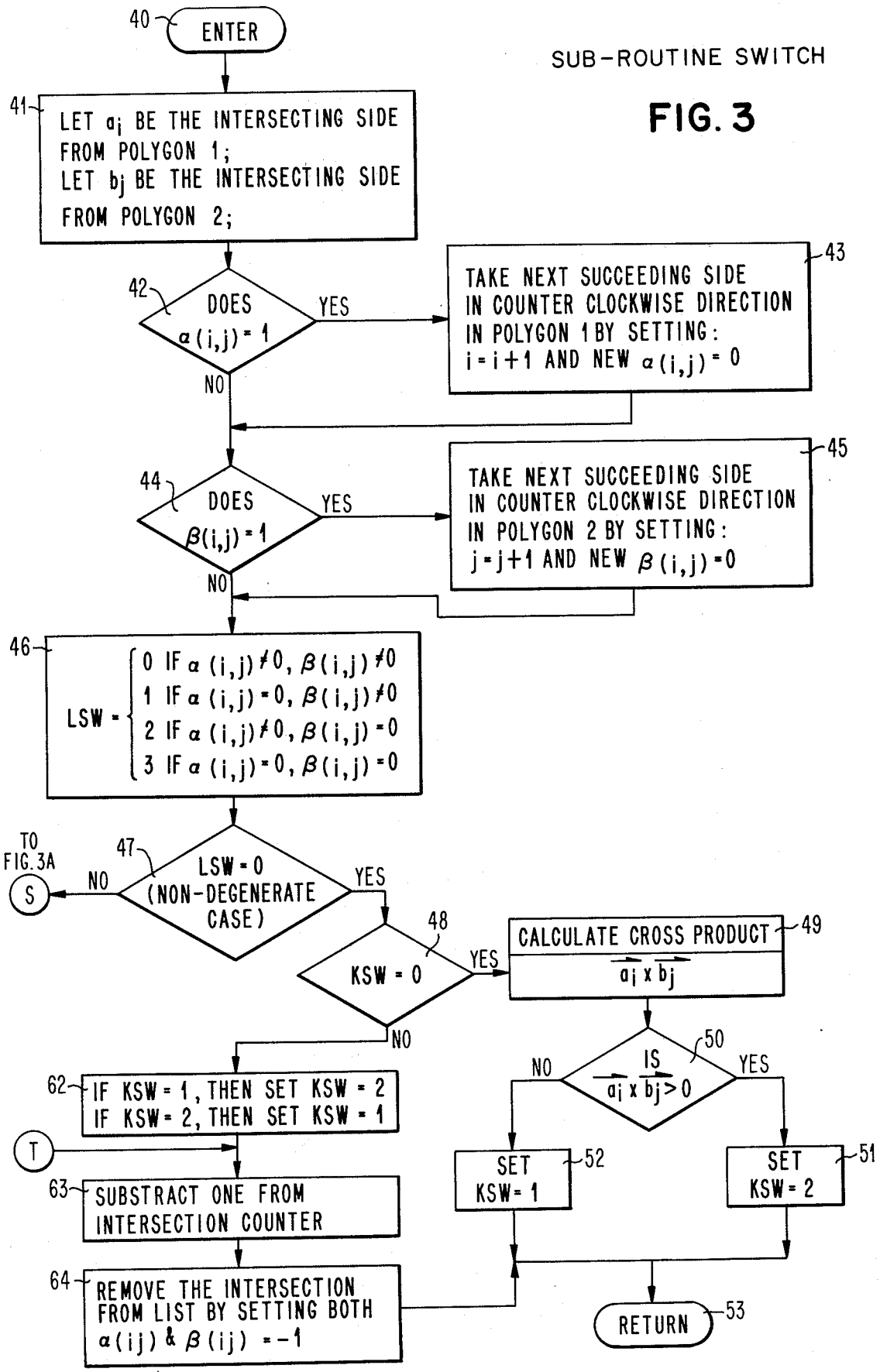
Figure 3A:
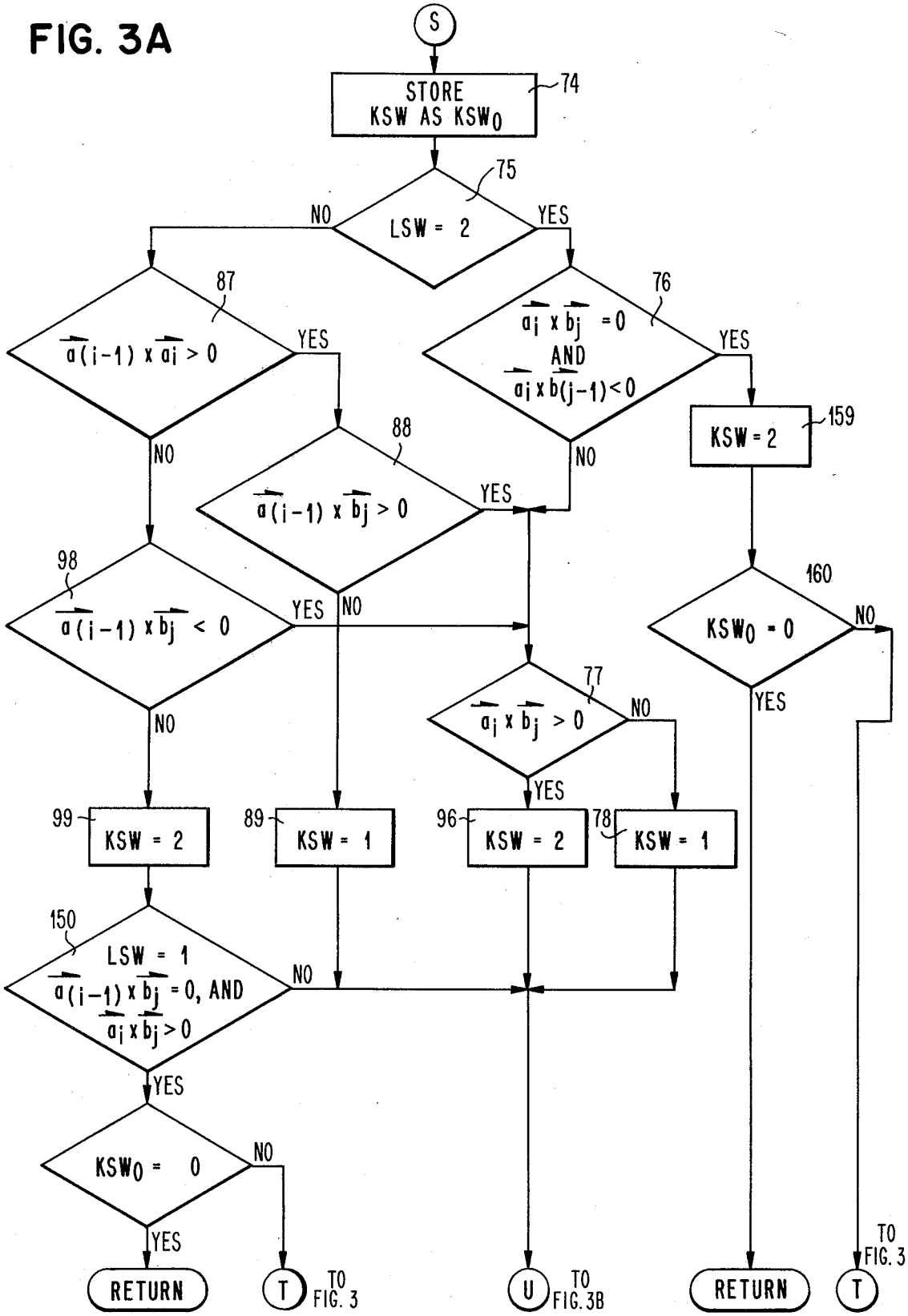
Figure 3B:
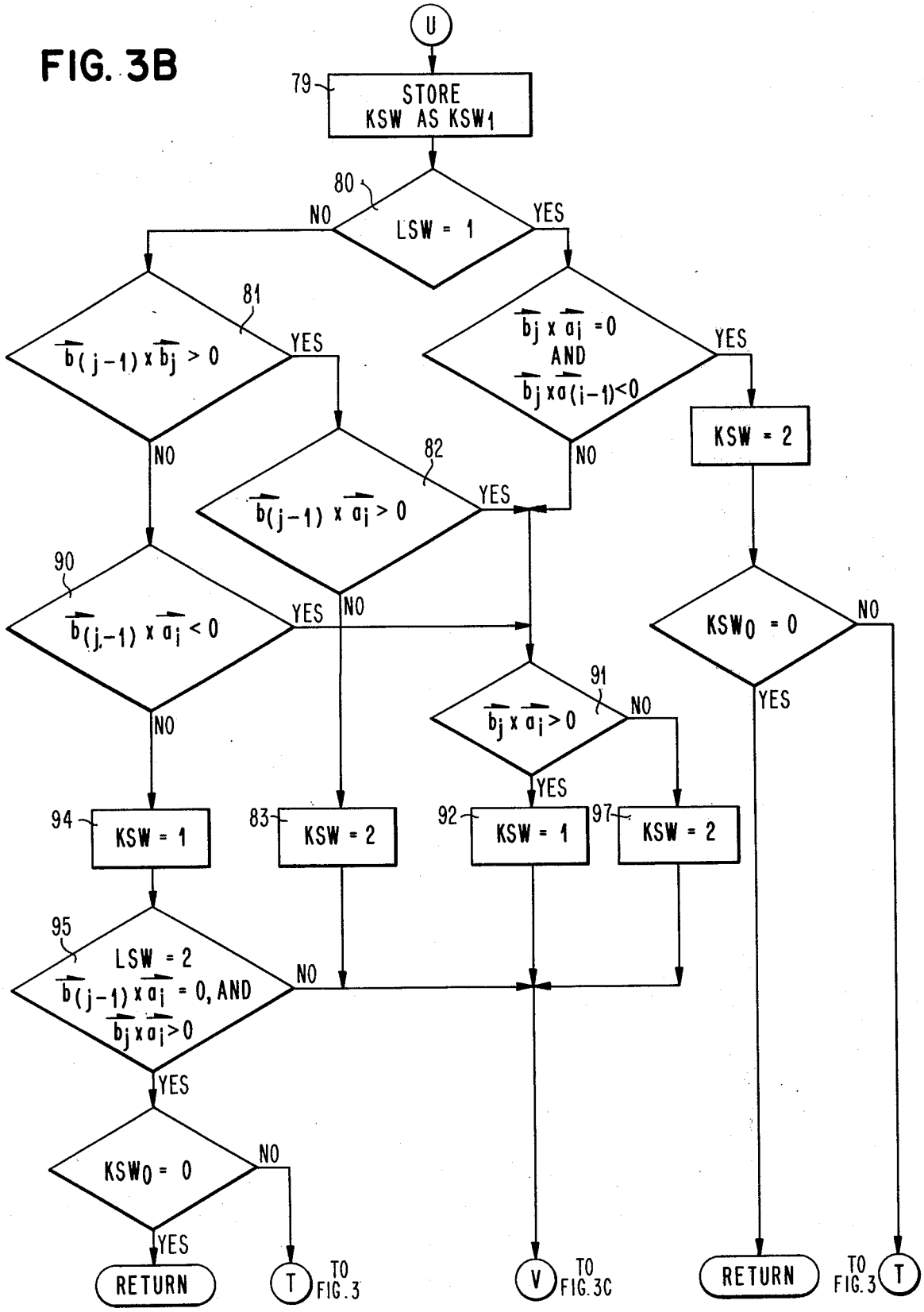
Figure 3C:
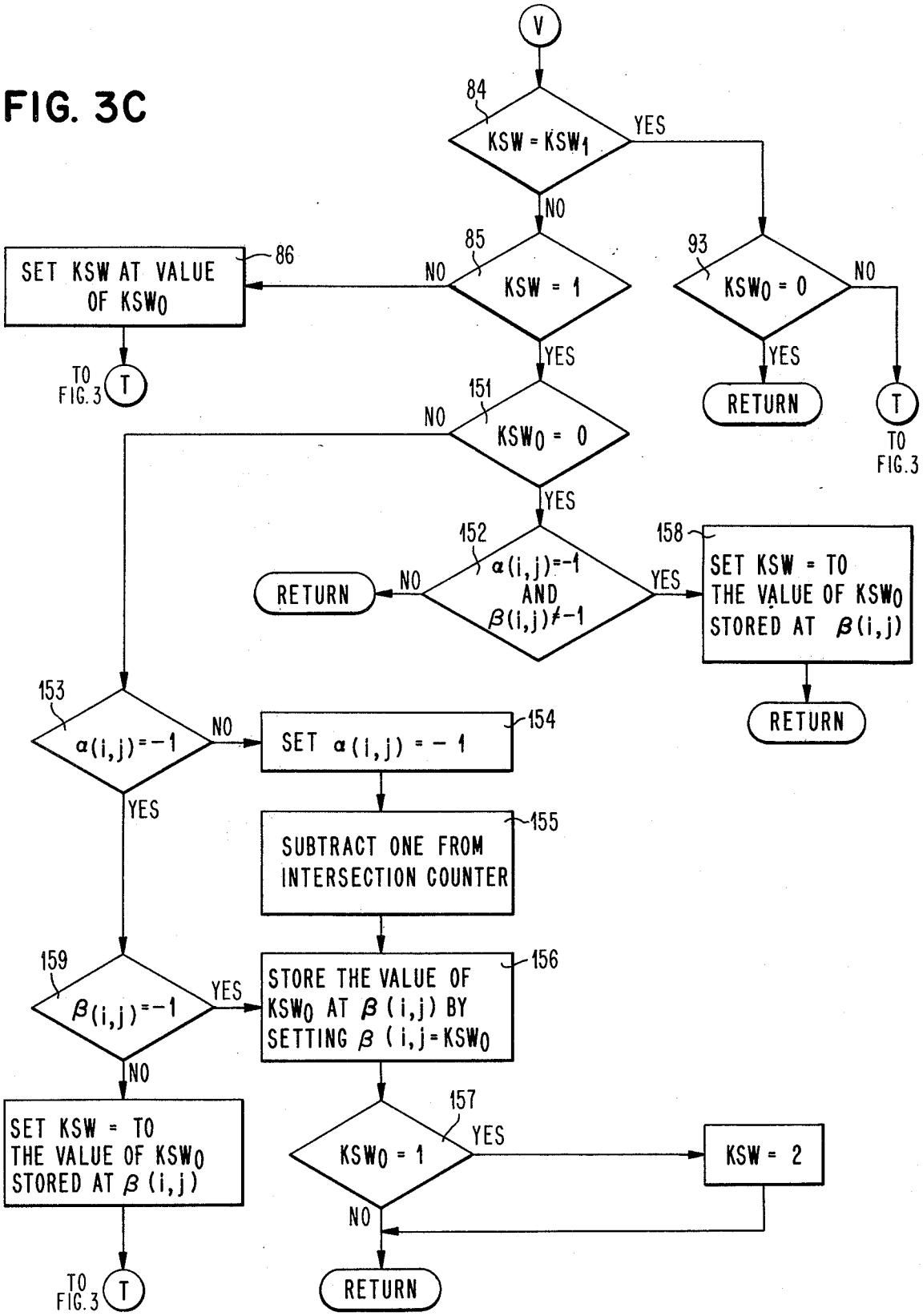
Figure 4:
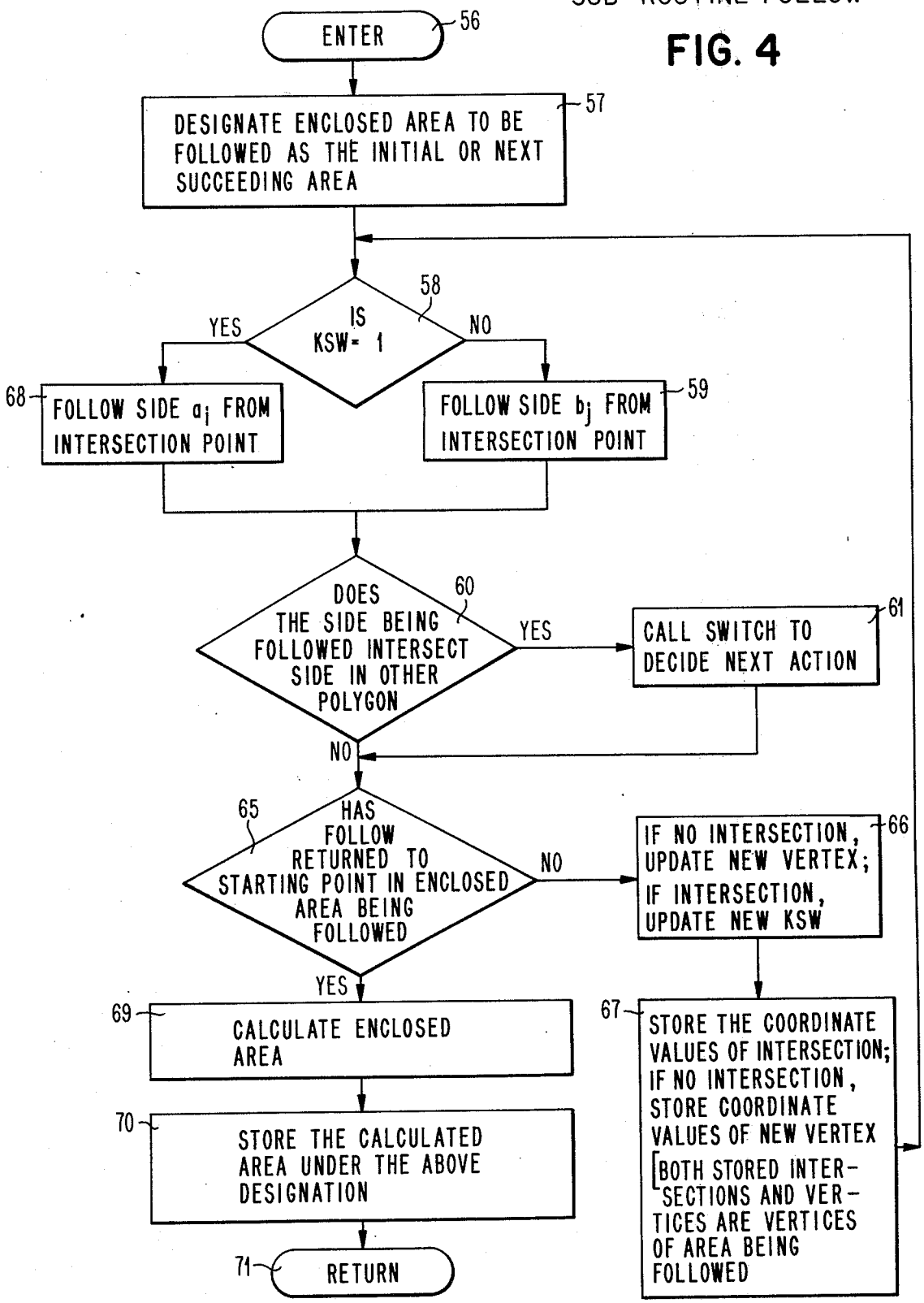
Figure 5:
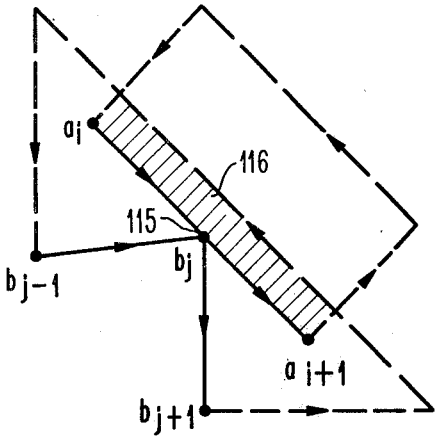
Figure 5A:
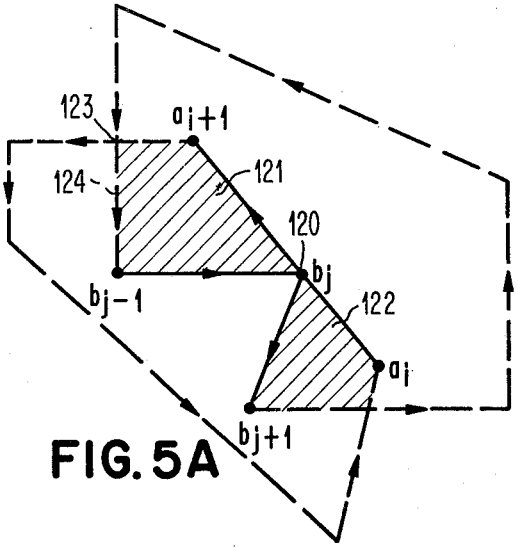
Figure 5B:
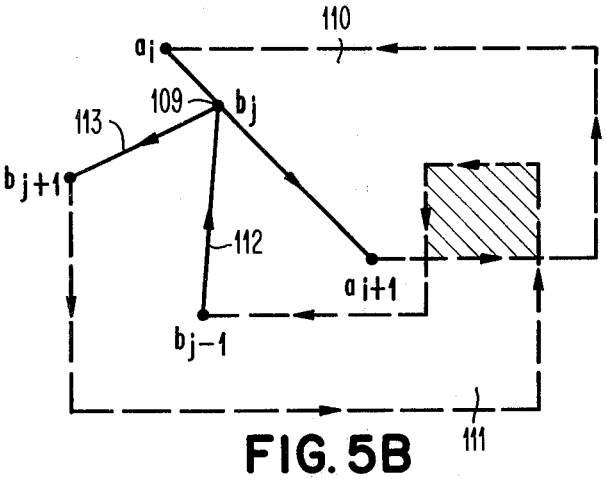
Figure 5C:
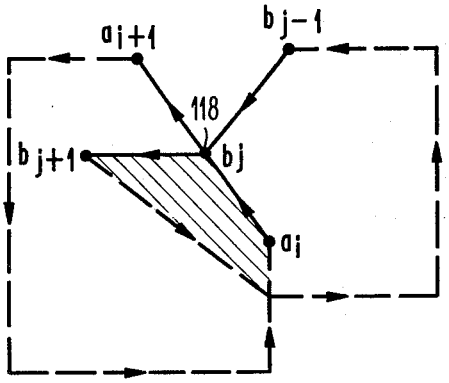
Figure 5D:
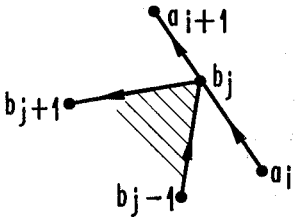
Figure 5E:
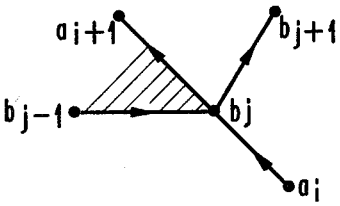
Figure 5F:
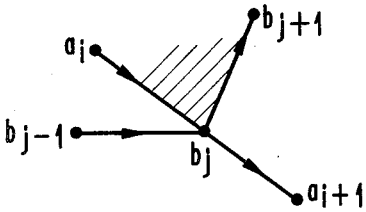
Figure 5G:
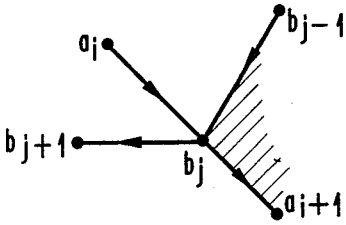
Figure 6:
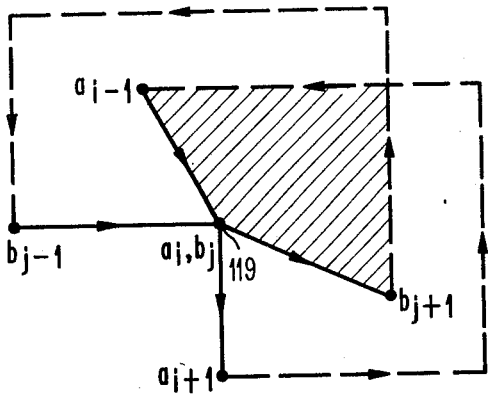
Figure 6A:
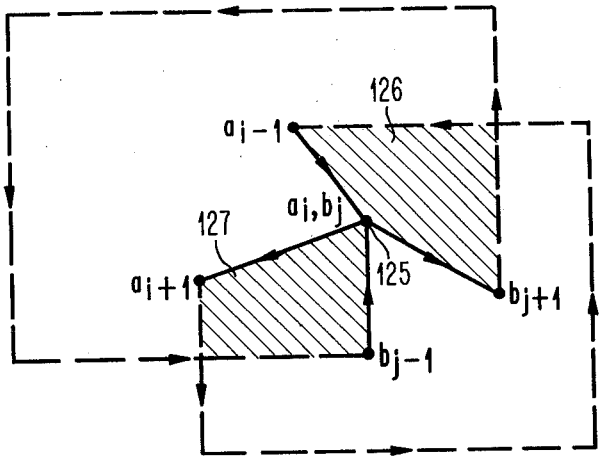
Figure 6B:
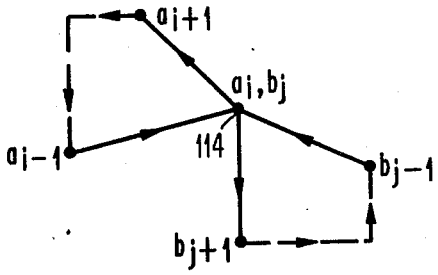
Figure 6C:
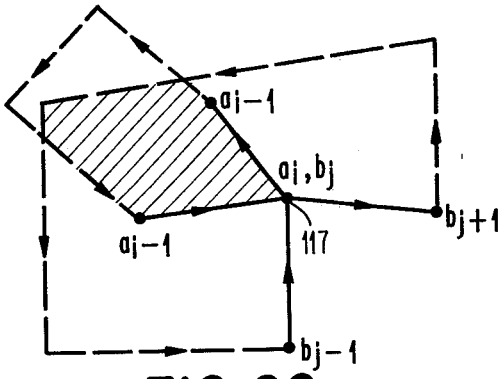
Figure 6D:
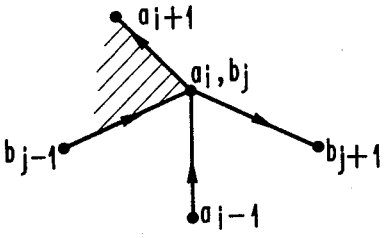
Figure 6E:
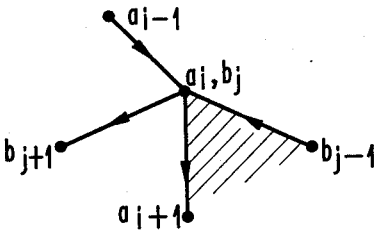
Figure 6F:
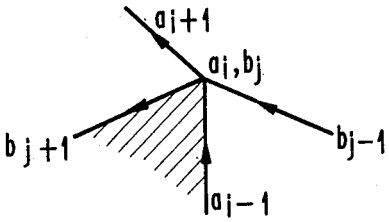
Figure 6G:
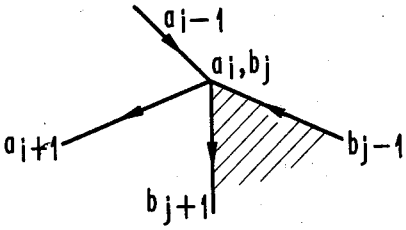

A system for determining the extent of overlap between two primary polygons which are simply connected and have vertices of known coordinate values. Each of the sides in each polygon is first defined in terms of parameters which have limits of constant values as shown by block 14 in FIG. 2. Then, as set forth in block 15 in FIG. 2, a determination is made as to whether each of the sides in one of the polygons intersects any side in the other polygon by respectively equating the parametric definitions of each of the sides in the first polygon with the parametric definitions of each of the sides in the second polygon. A pair of sides so equated will intersect if each side has a resultant parameter within said limits. Routines are provided for determining when intersections will be non-degenerate, and when they will be degenerate, and when there will be no intersections thus indicating that the polygons either completely overlap or have no overlap at all. Intersections will be non-degenerate if the resultant parameters for each of the sides is somewhere between said limits. Intersections will be degenerate if the resultant parameter for either side is at one of its limits. A non-degenerate intersection is defined as one involving only one side from each of the two polygons while a degenerate intersection involves an additional side from at least one of the two polygons. The non-degenerate intersections are vertices in subsidiary polygons formed by the overlap of the two primary polygons.

25 Claims, 11 Sheets Drawing,

84 Pages Specification

The file of this unexamined application may be inspected and copies thereof may be purchased (849 O.G. 1221, Apr. 9, 1968).

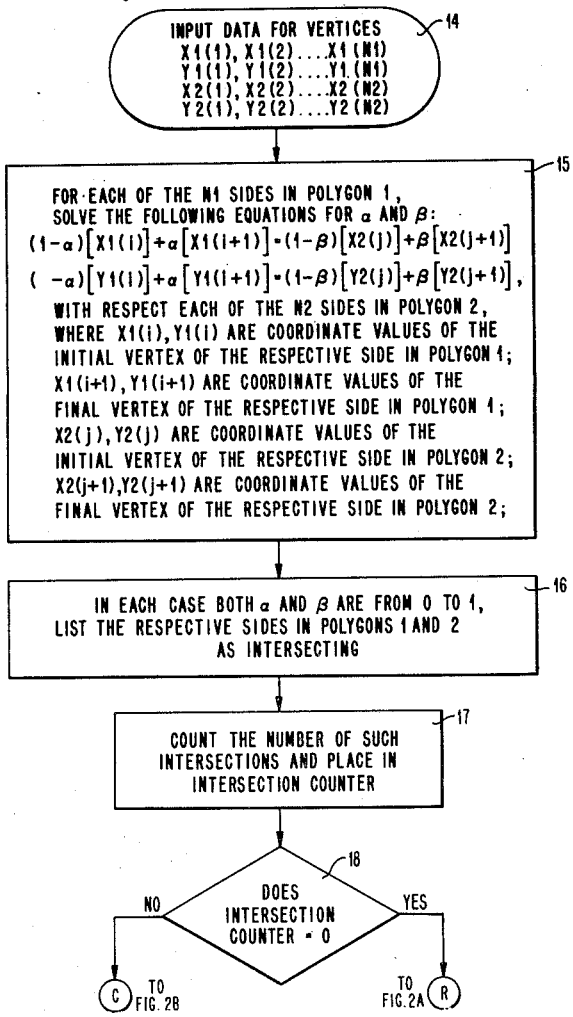

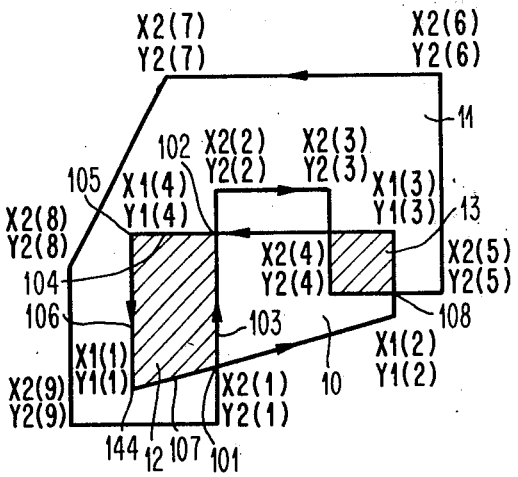
FIG. 1
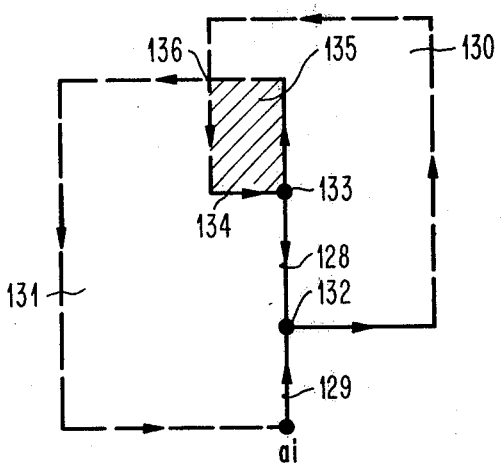
FIG. 7
FIG. 8
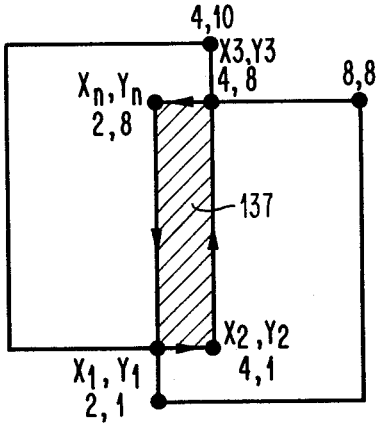
FIG. 9
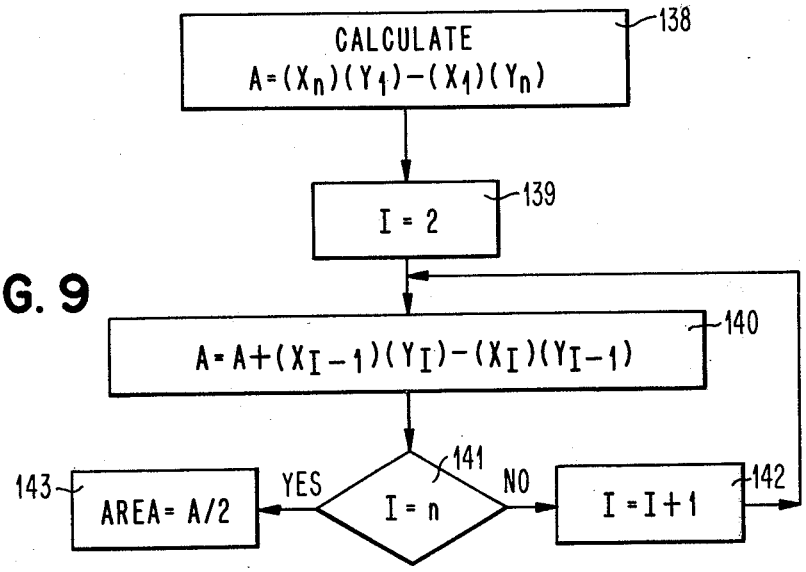

SUB-ROUTINE SWITCH

SUB-ROUTINE FOLLOW